US012649421B2

(12) United States Patent
Perez Ruiz et al.

(10) Patent No.: US 12,649,421 B2
(45) Date of Patent: Jun. 9, 2026

(54) VEHICLE TRIM PANEL STORAGE SYSTEMS

(71) Applicant: GM GLOBAL TECHNOLOGY OPERATIONS LLC, Detroit, MI (US)

(72) Inventors: Alejandro Perez Ruiz, Macomb, MI (US); Minerva Perez, Mexico City (MX); Javier Garfias, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 319 days.

(21) Appl. No.: 18/414,543

(22) Filed: Jan. 17, 2024

(65) Prior Publication Data

US 2025/0229719 A1      Jul. 17, 2025

(51) Int. Cl.
B60R 7/04 (2006.01)
B60N 3/10 (2006.01)
B60R 7/08 (2006.01)
B60R 13/02 (2006.01)

(52) U.S. Cl.
CPC .............. B60R 7/046 (2013.01); B60N 3/103 (2013.01); B60R 7/08 (2013.01); B60R 13/0243 (2013.01)

(58) Field of Classification Search
CPC ... B60R 7/04; B60R 7/046; B60R 2011/0021; B60R 2011/0019; B60R 2011/0003; B60R 2011/0059; B60R 2011/0071; B60R 13/0243; B60N 3/103
See application file for complete search history.

(56) References Cited

U.S. PATENT DOCUMENTS

| | | | | |
|---|---|---|---|---|
| 5,180,089 | A * | 1/1993 | Suman | B60N 3/00 296/153 |
| 5,823,724 | A * | 10/1998 | Lee | B60P 7/0815 410/112 |
| 5,915,777 | A * | 6/1999 | Gignac | B60N 3/12 224/543 |
| 6,648,290 | B1 * | 11/2003 | Aleman | B60N 2/28 248/311.2 |
| 7,234,619 | B2 * | 6/2007 | Hicks | B60R 7/046 224/543 |
| 7,980,614 | B2 * | 7/2011 | Denton | B60R 7/04 296/37.16 |
| 8,505,794 | B2 * | 8/2013 | Ardigo | B60R 7/08 224/543 |
| 10,045,607 | B2 * | 8/2018 | Steigerwald | A45F 3/14 |
| 10,941,899 | B2 * | 3/2021 | Carnevali | F16M 11/2085 |
| 2005/0092801 | A1 * | 5/2005 | Hicks | B60R 7/10 224/547 |

(Continued)

*Primary Examiner* — Gregory A Blankenship
(74) *Attorney, Agent, or Firm* — Ingrassia Fisher & Lorenz, LLP | IF&L

(57) ABSTRACT

A trim storage system for a vehicle includes a guide slot that extends along a longitudinal axis, and a guide including a first flange opposite a second flange. The first flange defines one or more first ribs that extend from the first flange, and the second flange defines one or more second ribs that extend toward a respective first rib of the first ribs to define one or more slots spaced apart along the longitudinal axis. A pocket is defined between adjacent slots of the slots. The trim storage system includes a fastener removably coupled to the pocket of the guide having an attachment portion configured to retain an item.

20 Claims, 12 Drawing Sheets

(56)  References Cited

U.S. PATENT DOCUMENTS

| | | | |
|---|---|---|---|
| 2008/0169667 A1* | 7/2008 | Siniarski | B60R 7/082 |
| | | | 296/37.8 |
| 2010/0007175 A1 | 1/2010 | Mayer et al. | |
| 2017/0209318 A1* | 7/2017 | Schroeder | F16M 13/022 |
| 2018/0222293 A1* | 8/2018 | Thomas | E05C 17/62 |
| 2019/0092247 A1* | 3/2019 | Dabel | B60N 3/083 |
| 2019/0118689 A1* | 4/2019 | Yamaguchi | B60N 2/30 |
| 2019/0337465 A1* | 11/2019 | Schmid | E05B 85/12 |
| 2023/0048639 A1* | 2/2023 | Braun | B60N 3/004 |
| 2025/0229719 A1* | 7/2025 | Perez Ruiz | B60R 7/046 |

* cited by examiner

VEHICLE TRIM PANEL STORAGE SYSTEMS

INTRODUCTION

The technical field generally relates to storage systems for vehicles, and more particularly relates to a trim panel storage system for use with a trim panel of a vehicle, such as a door trim panel.

Typically, a vehicle includes a passenger compartment, which has one or more doors to enclose the passenger compartment and protect passengers from an environment surrounding the vehicle. In certain instances, the doors may include one or more cupholders and map pockets, which enable a passenger to store various items, such as cups, trash, maps or the like in the door of the vehicle. The cupholders and map pockets, however, have a fixed size and are not customizable to suit a particular passenger's storage needs. For example, a passenger may desire to have an enlarged cup holder, or may desire additional cupholders instead of a map pocket.

Accordingly, it is desirable to provide a trim panel for a vehicle, which includes a storage system that enables customization to suit a passenger's storage needs. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a trim storage system for a vehicle. The trim storage system includes a guide slot that extends along a longitudinal axis, and a guide including a first flange opposite a second flange. The first flange defines one or more first ribs that extend from the first flange, and the second flange defines one or more second ribs that extend toward a respective first rib of the first ribs to define one or more slots spaced apart along the longitudinal axis. A pocket is defined between adjacent slots of the slots. The trim storage system includes a fastener removably coupled to the pocket of the guide having an attachment portion configured to retain an item.

The fastener includes a coupling portion that includes a first coupling tab and a second coupling tab, which are configured to be at least partially received within the pocket to removably couple the fastener to the pocket. The trim storage system includes a cover that defines the guide slot. The first coupling tab includes a first contact surface that extends along an axis that is substantially perpendicular to the longitudinal axis, and the first contact surface is removably coupled to the cover. The second coupling tab includes a second contact surface that extends along a second axis that is substantially parallel to the longitudinal axis, and the second contact surface is removably coupled to the pocket. The coupling portion includes a first arm opposite a second arm, the first arm and the second arm are elastically deformable to removably couple the fastener to the pocket, the first arm is coupled to the first coupling tab and the second arm is coupled to the second coupling tab. The attachment portion is a hook. The attachment portion is coupled to a cupholder. The trim storage system includes a cover that defines the guide slot, a second cover and a second guide that is configured to be coupled to the vehicle so as to be spaced apart from the cover and the guide. The second cover includes a second guide slot. The second guide is coupled to the second cover and defines one or more second slots spaced apart by one or more second pockets, and the trim storage system includes a second fastener having a second coupling portion and a second attachment portion. The second attachment portion is coupled to the cupholder. The attachment portion is coupled to a storage receptacle. The trim storage system includes a second fastener having a second coupling portion and a second attachment portion, and the attachment portion and the second attachment portion are each coupled to the storage receptacle. One first rib of the first ribs includes a first guide rib that includes a first guide ramp, one second rib of the second ribs includes a second guide rib that includes a second guide ramp, and the first guide ramp and the second guide ramp are defined proximate a keyed section of the guide slot.

Further provided according to various embodiments is a vehicle. The vehicle includes a trim panel, and a trim storage system coupled to the trim panel. The trim storage system includes a guide slot that extends along a longitudinal axis, and a guide. The guide includes a first flange opposite a second flange. The first flange and the second flange are coupled to the trim panel. The first flange defines a plurality of first ribs, and each first rib of the plurality of first ribs extends from a first surface of the first flange toward the second flange. The second flange defines a plurality of second ribs, and each second rib of the plurality of second ribs extends from a second surface of the second flange toward a respective first rib of the plurality of first ribs to define a plurality of slots spaced apart along the longitudinal axis. A respective pocket of a plurality of pockets is defined by the first surface and the second surface between adjacent slots of the plurality of slots. The trim storage system includes a fastener having a coupling portion and an attachment portion. The coupling portion is removably coupled to the pocket of the guide and the attachment portion is configured to retain an item.

The coupling portion includes a first coupling tab and a second coupling tab, which are configured to be at least partially received within the pocket to removably couple the fastener to the pocket. The vehicle includes a cover that defines the guide slot, the cover coupled to the trim panel, and the first flange and the second flange are coupled to the cover. The first coupling tab includes a first contact surface that extends along an axis that is substantially perpendicular to the longitudinal axis, and the first contact surface is removably coupled to the cover. The second coupling tab includes a second contact surface that extends along a second axis that is substantially parallel to the longitudinal axis, and the second contact surface is removably coupled to the pocket. The coupling portion includes a first arm opposite a second arm, the first arm and the second arm are elastically deformable to removably couple the fastener to the pocket, the first arm is coupled to the first coupling tab and the second arm is coupled to the second coupling tab. The attachment portion is a hook. The attachment portion is coupled to a cupholder or is coupled to a storage receptacle.

Also provided according to various embodiments is an accessory for a vehicle. The accessory includes an attachment portion configured to be coupled to an item, and a coupling portion coupled to the attachment portion. The coupling portion includes a body having a first coupling tab and a second coupling tab. The first coupling tab is spaced apart from the second coupling tab by a distance. The body is compressible to move the first coupling tab and the second coupling tab to removably couple the accessory to the vehicle.

The first coupling tab and the second coupling tab are configured to be received within a guide slot associated with the vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. In addition, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

Figure 1:
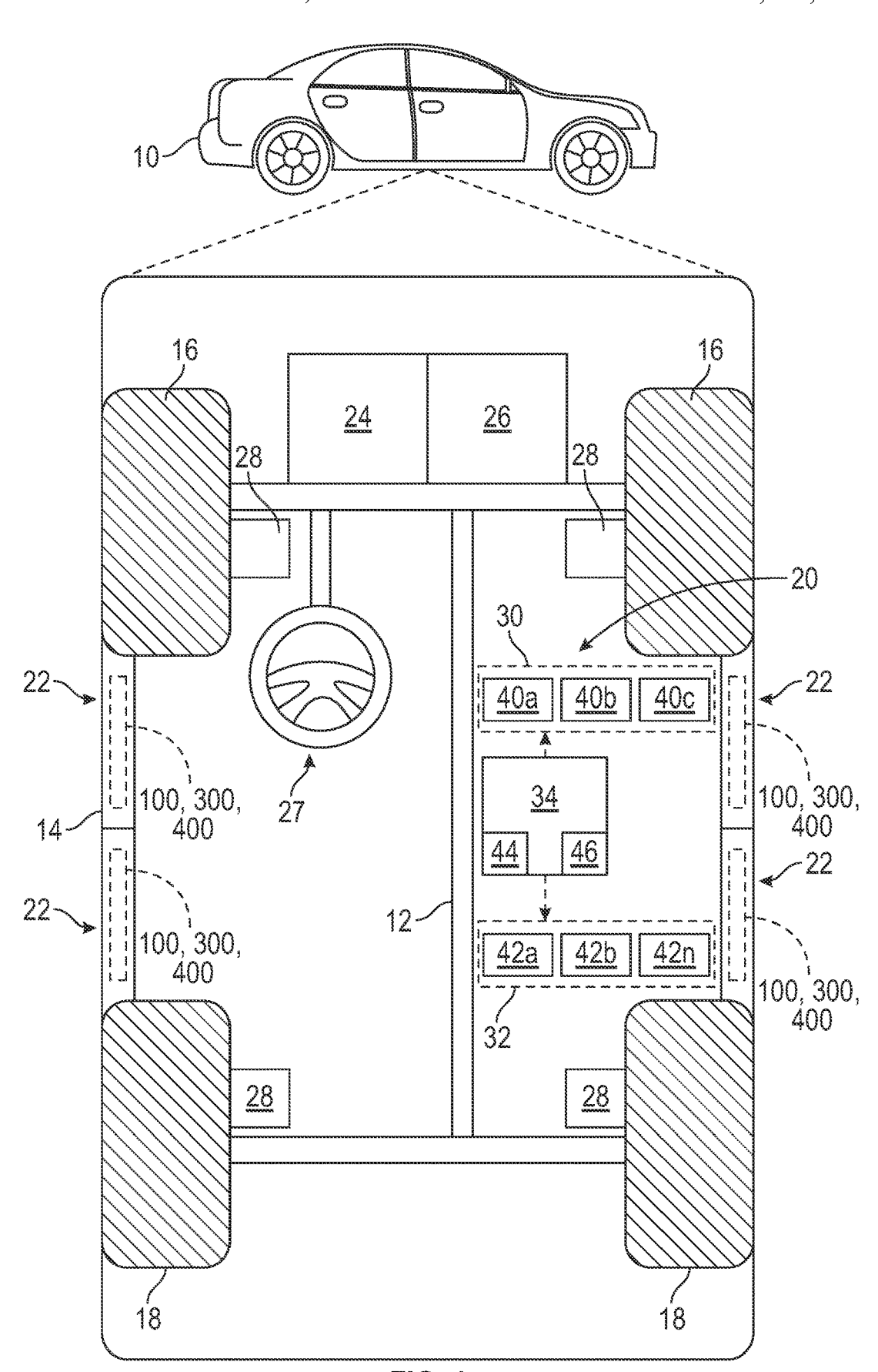
FIG. 1 is a functional block diagram illustrating a vehicle including at least one door having a trim panel with an exemplary trim storage system in accordance with various embodiments.

With reference to FIG. 1, a trim storage system shown generally as 100, 300, 400 is associated with a vehicle 10 in accordance with various embodiments. As will be described, the trim storage system 100, 300, 400 enables a passenger to select storage options easily and without special tools. This improves customer satisfaction, and ensures the storage available in the vehicle 10 is customized to suit the needs of the particular passenger.

As depicted in FIG. 1, the vehicle 10 generally includes a chassis 12, a body 14, front wheels 16, and rear wheels 18. The body 14 is arranged on the chassis 12 and substantially encloses components of the vehicle 10, including a passenger cabin shown generally as 20. One or more doors 22 are coupled to the body 14 to enclose the passenger cabin 20. In this example, the vehicle 10 is shown with four doors 22, however, the vehicle 10 may include any number of doors 22. As will be described, each of the doors 22 includes a respective one of the trim storage systems 100, 300, 400. The body 14 and the chassis 12 may jointly form a frame. The vehicle wheels 16-18 are each rotationally coupled to the chassis 12 near a respective corner of the body 14. In various embodiments, the vehicle 10 is an autonomous vehicle or a semi-autonomous vehicle. As can be appreciated, the trim storage system 100, 300, 400 can be implemented in other non-autonomous systems and is not limited to the present embodiments. The vehicle 10 is depicted in the illustrated embodiment as a passenger car, but it should be appreciated that any other vehicle, including motorcycles, trucks, sport utility vehicles (SUVs), recreational vehicles (RVs), etc., can also be used.

As shown, the vehicle 10 generally includes a propulsion system 24, a transmission system 26, a steering system 27, a brake system 28, a sensor system 30, an actuator system 32 and at least one controller 34. The propulsion system 24 may, in various embodiments, include an internal combustion engine, an electric machine such as a traction motor, and/or a fuel cell propulsion system. The transmission system 26 is configured to transmit power from the propulsion system 24 to the vehicle wheels 16 and 18 according to selectable speed ratios. According to various embodiments, the transmission system 26 may include a step-ratio automatic transmission, a continuously-variable transmission, or other appropriate transmission.

The brake system 28 is configured to provide braking torque to the vehicle wheels 16 and 18. Brake system 28 may, in various embodiments, include friction brakes, brake by wire, a regenerative braking system such as an electric machine, and/or other appropriate braking systems.

The steering system 27 influences a position of the vehicle wheels 16 and/or 18. While depicted as including a steering wheel for illustrative purposes, in some embodiments contemplated within the scope of the present disclosure, the steering system 27 may not include a steering wheel.

The sensor system 30 includes one or more sensing devices 40a-40n that sense observable conditions of the exterior environment and/or the interior environment of the vehicle 10. In various embodiments, the sensing devices 40a-40n include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. The sensor system 30 is in communication with the controller 34 over a communication medium.

The actuator system 32 includes one or more actuator devices 42a-42n that control one or more vehicle features such as, but not limited to, the propulsion system 24, the transmission system 26, the steering system 27, and the brake system 28. In various embodiments, the vehicle 10 may also include interior and/or exterior vehicle features not illustrated in FIG. 1, such as a trunk, liftgate, and cabin features such as air, music, lighting, touch-screen display components, active safety seat or haptic seat, and the like.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

Figure 2:
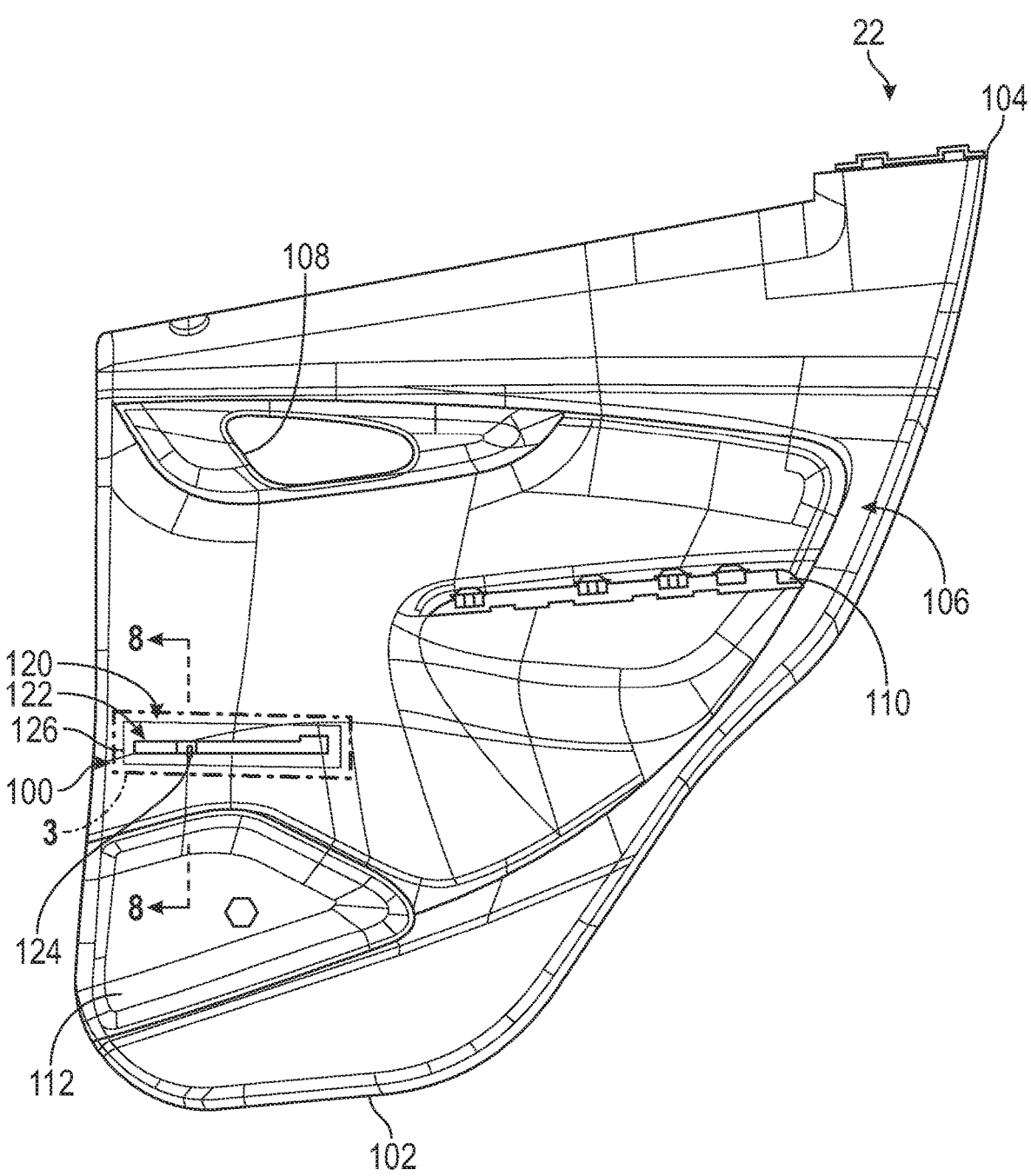
FIG. 2 is a front view of one of the doors of FIG. 1, which includes the trim panel and the trim storage system in accordance with various embodiments.

In this example, each of the trim storage systems 100, 300, 400 associated with each of the doors 22 is the same, and thus, the following description is applicable to each door 22 and trim storage system 100, 300, 400 associated with the vehicle 10. For the sake of brevity, a single one of the doors 22 and the trim storage systems 100, 300, 400 will be described in detail herein. With reference to FIG. 2, the trim storage system 100 associated with one of the doors 22 is shown in greater detail. The door 22 includes an outer panel 102 and an inner panel 104 opposite the outer panel 102. The inner panel 104 includes a trim panel 106. In one example, each trim panel 106 includes a door pull handle receptacle 108, a user interface panel receptacle 110, a speaker grill 112 and the trim storage system 100. In this example, the trim panel 106 does not include or is devoid of a cup holder and a map pocket, and the trim storage system 100 provides all of the available storage for the door 22, which is customizable by a user. The door pull handle receptacle 108 receives a door handle assembly, which may be used by the user to open and close the door 22. The user interface panel receptacle 110 receives a user interface, such as one or more buttons, switches, etc. which may be responsive to input from the user to send one or more control signals to the controller 34. For example, the user interface may include one or more buttons to control a window associated with the door 22, a lock associated with the door 22, etc. The speaker grill 112 encloses a speaker coupled between the inner panel 104 and the outer panel 102.

Figure 3:
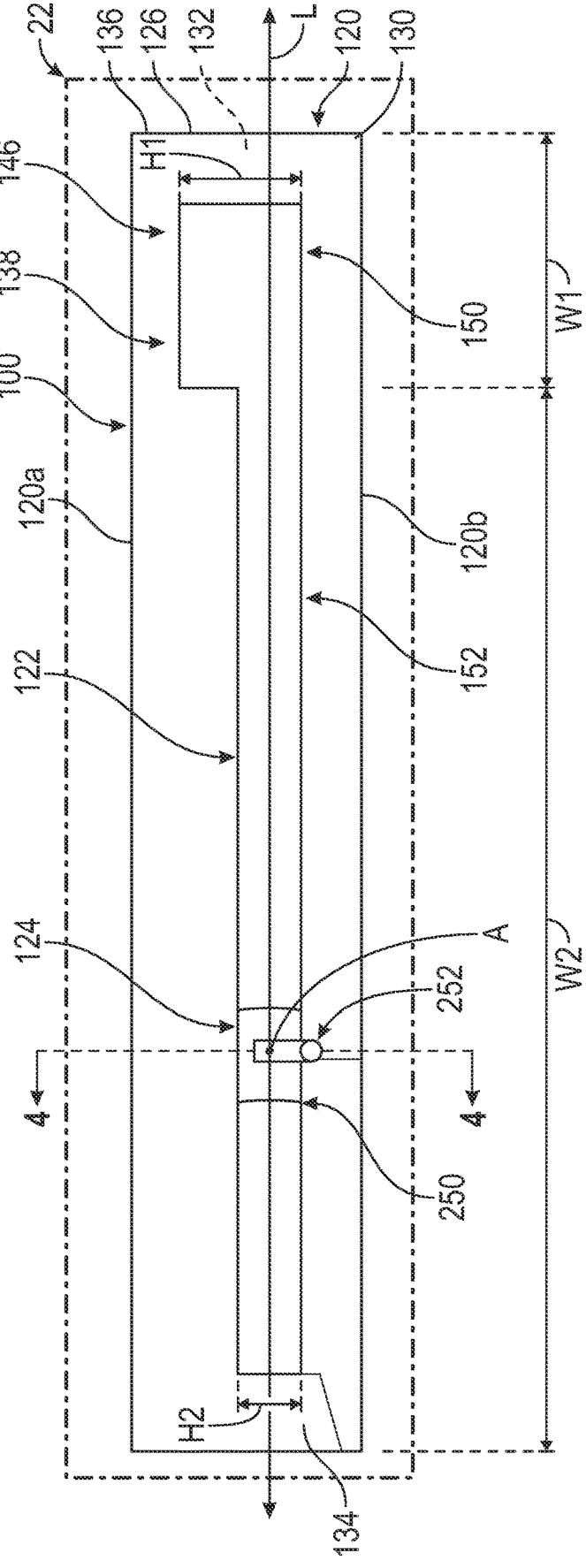
FIG. 3 is a front detail view of the trim storage system taken at 3 in FIG. 2, in which the trim panel is removed for clarity in accordance with various embodiments.

In one example, the trim storage system 100 includes a cover 120, a guide 122 and at least one fastener 124. In this example, the trim storage system 100 is coupled to the door 22 so as to be received within a recess 126 defined in the trim panel 106 of the door 22. By providing the trim storage system 100 received within the recess 126, the trim storage system 100 may be removable such that the door 22 may be manufactured to include or not include the trim storage system 100 as desired. The trim storage system 100 may be coupled to the recess 126 via a press-fit, snap-fit, adhesives, mechanical fasteners, welding, etc. Generally, the trim storage system 100 is coupled to the door 22 such that the guide 122 is recessed from the inner panel 104, and is positioned between the inner panel 104 and the outer panel 102. The cover 120 is coupled to the inner panel 104 so as to be flush with the inner panel 104. In this example, the cover 120 and the guide 122 each have a substantially rectangular shape, however, in other examples, the cover 120 and the guide 122 may have any polygonal shape that conforms with the trim panel 106, and may be curved, etc. With reference to FIG. 3, the trim storage system 100 is shown in greater detail. In this example, the cover 120 includes a first cover surface 130 opposite a second cover surface 132, a first cover side 134 opposite a second cover side 136, and a cover guide slot 138.

The first cover surface 130 defines an exterior surface of the trim storage system 100. The first cover surface 130 is composed of a polymer-based material, natural fiber, textile, metal or metal alloy, and may be molded, cast, sewn, woven, additively manufactured, etc. Generally, the first cover surface 130 is composed of the same material as the inner panel 104 so that the first cover surface 130 provides a uniform aesthetic appearance with the trim panel 106. Thus, in certain instances, the first cover surface 130 may include a texture or the like, so as to be consistent with the aesthetic appearance of the trim panel 106.

Figure 4:
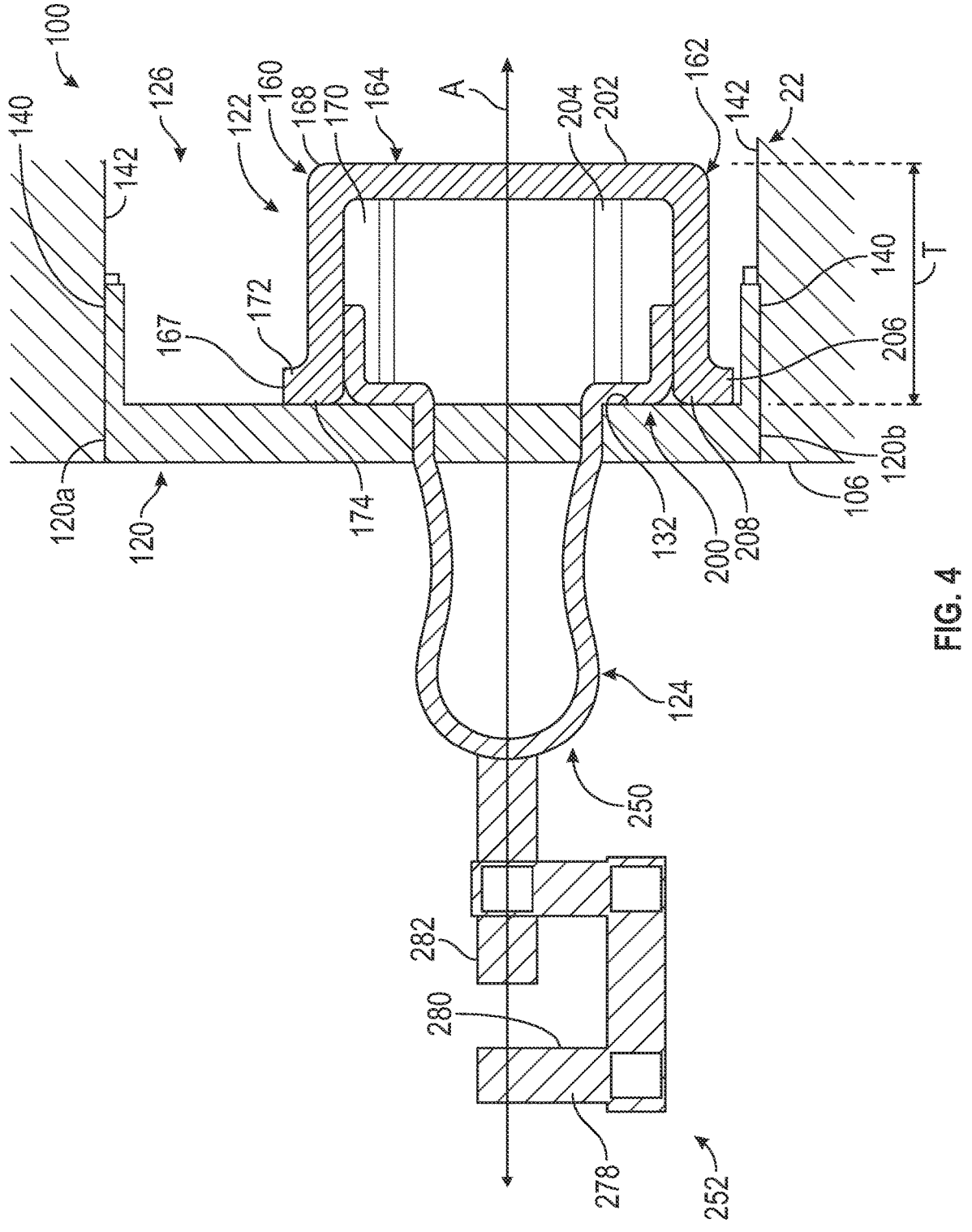
FIG. 4 is a cross-sectional view of the trim storage system, taken along line 4-4 of FIG. 3.

With reference to FIG. 4, the second cover surface 132 is coupled to the guide 122. In this example, the second cover surface 132 is substantially smooth or planar, and includes at least one or a pair of coupling tabs 140. In this example, the coupling tabs 140 extend axially outward from the second cover surface 132. The coupling tabs 140 are on opposed ends 120a, 120b of the cover 120, and extend from the first cover side 134 to the second cover side 136. The coupling tabs 140 cooperate with sidewalls 142 of the recess 126 to couple the trim storage system 100 to the trim panel 106. In this example, each of the coupling tabs 140 is planar, however, the coupling tabs 140 may include one or more projections to assist in coupling the trim storage system 100 to the trim panel 106. The coupling tabs 140 are cantilevered relative to the second cover surface 132 to assist in coupling the trim storage system 100 to the trim panel 106. Generally, the coupling tabs 140 each extend for the same distance along an axis A defined through the trim storage system 100. The axis A is substantially perpendicular to a longitudinal axis L of the trim storage system 100 (FIG. 3). The distance the coupling tabs 140 extend is different, and less than a thickness T of the guide 122.

With reference back to FIG. 3, the first cover side 134 interconnects the ends 120*a*, 120*b* of the cover 120. The first cover side 134 and the second cover side 136 each extend along a respective axis, which is substantially perpendicular to the longitudinal axis L. The cover guide slot 138 is defined through the cover 120 so as to extend through both the first cover surface 130 and the second cover surface 132. The cover guide slot 138 extends along the longitudinal axis L. In one example, the cover guide slot 138 is a keyed slot, and includes a keyed section 150 and a guide section 152. The keyed section 150 is shaped to correspond with the fastener 124, and in one example, the keyed section 150 is substantially rectangular. The keyed section 150 has a width W1 along the longitudinal axis L that is different and less than a second width W2 of the guide section 152. The keyed section 150 also has a height H1 radially, along an axis A2, which is different and greater than a second height H2 of the guide section 152. The axis A2 is perpendicular to the axis A, and the longitudinal axis L. The enlarged height H1 and width W1 of the keyed section 150 enables the insertion and removal of the fastener 124. It should be noted that the shape of the keyed section 150 is merely exemplary, and that the keyed section 150 may have any desired shape that corresponds with a shape of the fastener 124. In this example, the keyed section 150 is defined proximate or adjacent to the second cover side 136, however, in other examples, the keyed section 150 may be defined proximate or adjacent to the first cover side 134.

The guide section 152 is in communication with the keyed section 150. The guide section 152 extends along the longitudinal axis L from the keyed section 150 to proximate or adjacent to the first cover side 134. The guide section 152 receives the fastener 124 from the keyed section 150, and guides the fastener 124 as the fastener 124 moves relative to the guide 122. Generally, the guide section 152 cooperates with a portion of the fastener 124 to assist in retaining the fastener 124 within the guide 122. In this example, the guide section 152 is substantially rectangular, however, in other embodiments, the guide section 152 may have a different shape to comport with the shape of the fastener 124.

Figure 5:
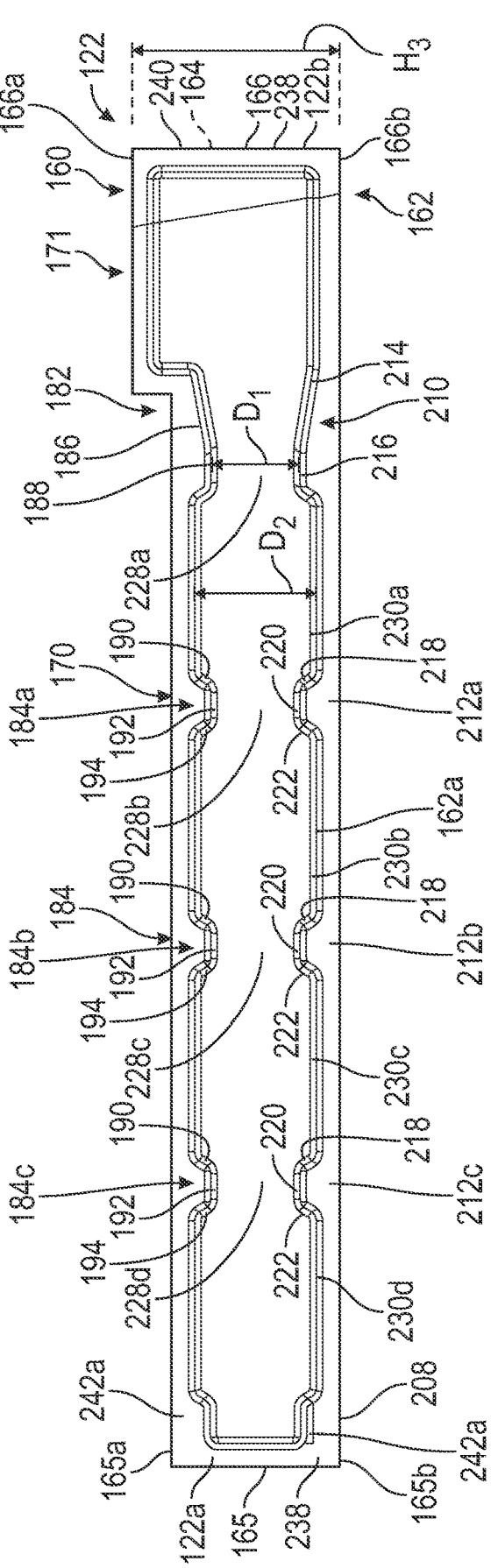
FIG. 5 is a front view of a guide of the trim storage system in accordance with various embodiments.

With reference to FIGS. 4 and 5, the guide 122 is substantially U-shaped, and includes a first flange 160, a second flange 162 opposite the first flange 160 and a base 164. Sidewalls 165, 166 are connected to the base 164, and interconnect the first flange 160 and the second flange 162 on opposed sides 122*a*, 122*b* of the guide 122 (FIG. 5). In one example, the guide 122 is composed of a metal, metal alloy or polymer-based material, and may be molded, cast, additively manufactured, etc. The first flange 160 and the second flange 162 extend axially, along the axis A. The first flange 160 includes a first flange end 167, an opposite second flange end 168 and a plurality of first ribs 170. The first flange 160 also includes a raised portion 171 at the second side 122*b* of the guide 122 that extends toward the first side 122*a*. Generally, the raised portion 171 extends for the width W1 of the keyed section 150 (FIG. 3) of the cover 120 so that the shape of the guide 122 corresponds with the shape of the cover 120. The second side 122*b* also has a height H3, which is different and greater than the height H1 of the cover 120. The first flange end 167 includes a lip 172 that cooperates to define a first contact surface 174. The first contact surface 174 is coupled to the second cover surface 132 of the cover 120. The second flange end 168 is coupled to the base 164.

With reference to FIG. 5, the plurality of first ribs 170 extend from a first interior surface 160*a* of the first flange 160 toward the second flange 162. In this example, the plurality of first ribs 170 comprise a first guide rib 182 and three first lock ribs 184, however, the first flange 160 may include any number of first ribs 170. The first ribs 170 cooperate with the second flange 162 to compress a portion of the fastener 124. In one example, the first guide rib 182 includes a first guide ramp surface 186 and a first guide rib surface 188. The first guide ramp surface 186 has a negative slope, and is defined to extend inward toward the second flange 162. The first guide ramp surface 186 cooperates with the second flange 162 to gradually compress the portion of the fastener 124 as the fastener 124 moves toward the first side 122*a* of the guide 122 or to gradually enable the expansion of the portion of the fastener 124 as the fastener 124 moves toward the second side 122*b* of the guide 122. The first guide rib surface 188 is substantially planar or flat, and cooperates with the second flange 162 to compress or deform the portion of the fastener 124 within an elastic range of the portion of the fastener 124. In this regard, a distance D1 between the first guide rib surface 188 and the second flange 162 is different, and less than, a distance D2 between the first interior surface 160*a* of the first flange 160 and a second interior surface 162*a* of the second flange 162. Generally, the distances D1, D2 may be based on a compressibility of the fastener 124. A difference between the distance D1 and the distance D2 is predetermined to lock the fastener 124 in place on the guide 122.

In one example, the guide 122 includes three first lock ribs 184*a*-184*c*. Each of the first lock ribs 184*a*-184*c* includes a first lock ramp surface 190, a first lock surface 192 and a second lock ramp surface 194. The first lock ramp surface 190 has a negative slope, and is defined to extend inward toward the second flange 162. The first lock ramp surface 190 cooperates with the second flange 162 to gradually compress the portion of the fastener 124 as the fastener 124 moves toward the first side 122*a* of the guide 122 or to gradually enable the expansion of the portion of the fastener 124 as the fastener 124 moves toward the second side 122*b* of the guide 122. The negative slope of the first lock ramp surface 190 is different and greater than the negative slope of the first guide ramp surface 186. The first lock surface 192 is substantially planar or flat, and cooperates with the second flange 162 to compress the portion of the fastener 124 within the elastic range of the portion of the fastener 124. The first lock surface 192 and the second flange 162 define the distance D1. The second lock ramp surface 194 has a positive slope, and is defined to extend inward toward the second flange 162. The second lock ramp surface 194 cooperates with the second flange 162 to gradually enable the expansion of the portion of the fastener 124 as the fastener 124 moves toward the first side 122*a* of the guide 122 or to gradually compress the portion of the fastener 124 as the fastener 124 moves toward the second side 122*b* of the guide 122. The slope of the second lock ramp surface 194 is about opposite and equal to the slope of the first lock ramp surface 190.

With reference to FIG. 4, the second flange 162 includes a third flange end 200, an opposite fourth flange end 202 and a plurality of second ribs 204. The third flange end 200 includes a second lip 206 that cooperates to define a second contact surface 208. The second contact surface 208 is coupled to the second cover surface 132 of the cover 120. The fourth flange end 202 is coupled to the base 164. With reference to FIG. 5, the plurality of second ribs 204 extend from the second interior surface 162a of the second flange 162 toward the first flange 160.

In this example, the plurality of second ribs 204 comprise a second guide rib 210 and three second lock ribs 212, however, the second flange 162 may include any number of second ribs 204. The second ribs 204 cooperate with the first ribs 170 to compress a portion of the fastener 124. In one example, the second guide rib 210 includes a second guide ramp surface 214 and a second guide rib surface 216. The second guide ramp surface 214 has a negative slope, and is defined to extend inward toward the first flange 160. The second guide ramp surface 214 cooperates with the first guide ramp surface 186 to gradually compress the portion of the fastener 124 as the fastener 124 moves toward the first side 122a of the guide 122 or to gradually enable the expansion of the portion of the fastener 124 as the fastener 124 moves toward the second side 122b of the guide 122. The second guide rib surface 216 is substantially planar or flat, and cooperates with the first guide rib surface 188 to compress the portion of the fastener 124 within the elastic range of the portion of the fastener 124. The first guide rib surface 188 and the second guide rib surface 216 define the distance D1.

In one example, the guide 122 includes three second lock ribs 212a-212c, which are positioned opposite a respective one of the first lock ribs 184a-184c. Each of the second lock ribs 212a-212c includes a third lock ramp surface 218, a second lock surface 220 and a fourth lock ramp surface 222. The third lock ramp surface 218 has a negative slope, and is defined to extend inward toward the first lock ramp surface 190. The third lock ramp surface 218 cooperates with the first lock ramp surface 190 to gradually compress the portion of the fastener 124 as the fastener 124 moves toward the first side 122a of the guide 122 or to gradually enable the expansion of the portion of the fastener 124 as the fastener 124 moves toward the second side 122b of the guide 122. The negative slope of the third lock ramp surface 218 is different and greater than the negative slope of the second guide ramp surface 214. The second lock surface 220 is substantially planar or flat, and cooperates with the first lock surface 192 to compress the portion of the fastener 124 within the elastic range of the portion of the fastener 124. The first lock surface 192 and the second lock surface 220 define the distance D1. The fourth lock ramp surface 222 has a positive slope, and is defined to extend inward toward the second lock ramp surface 194. The fourth lock ramp surface 222 cooperates with the second lock ramp surface 194 to gradually enable the expansion of the portion of the fastener 124 as the fastener 124 moves toward the first side 122a of the guide 122 or to gradually compress the portion of the fastener 124 as the fastener 124 moves toward the second side 122b of the guide 122. The slope of the fourth lock ramp surface 222 is about opposite and equal to the slope of the third lock ramp surface 218.

The rib surfaces 188, 216 and the lock surfaces 192, 220 cooperate to define respective slots 228a-228d, which are spaced apart along the guide 122 from the first side 122a to the second side 122b. The slots 228a-228d generally require the compression of the fastener 124 to pass through the slot 228a-228d, which inhibits the fastener 124 from moving unintentionally. This ensures that once the fastener 124 is coupled within the guide 122, the fastener 124 remains seated within the guide 122 until removed by the user.

Generally, by providing the distance D1 between the first ribs 170 of the first flange 160 and the second ribs 204 of the second flange 162, a continued movement of the fastener 124 causes the fastener 124 to expand and seat in a respective pocket 230a-230d defined between the pairs of the first ribs 170 and the second ribs 204. In this example, the first ribs 170 cooperate with the second ribs 204 to define four pockets 230a-230d, however, the first flange 160 and the second flange 162 may define any number of the pockets 230. The pockets 230a-230d receive the portion of the fastener 124 such that the fastener 124 seats within the respective pocket 230a-230d. Generally, each of the pockets 230a-230d are defined with the distance D2. Thus, in order to remove the fastener 124 from the respective pocket 230a-230d into the respective slot 228a-228d, a force is required to compress the portion of the fastener 124 to slide the fastener 224 through the respective slots 228a-228d until the fastener 124 may be removed through the keyed section 150.

Figure 6:
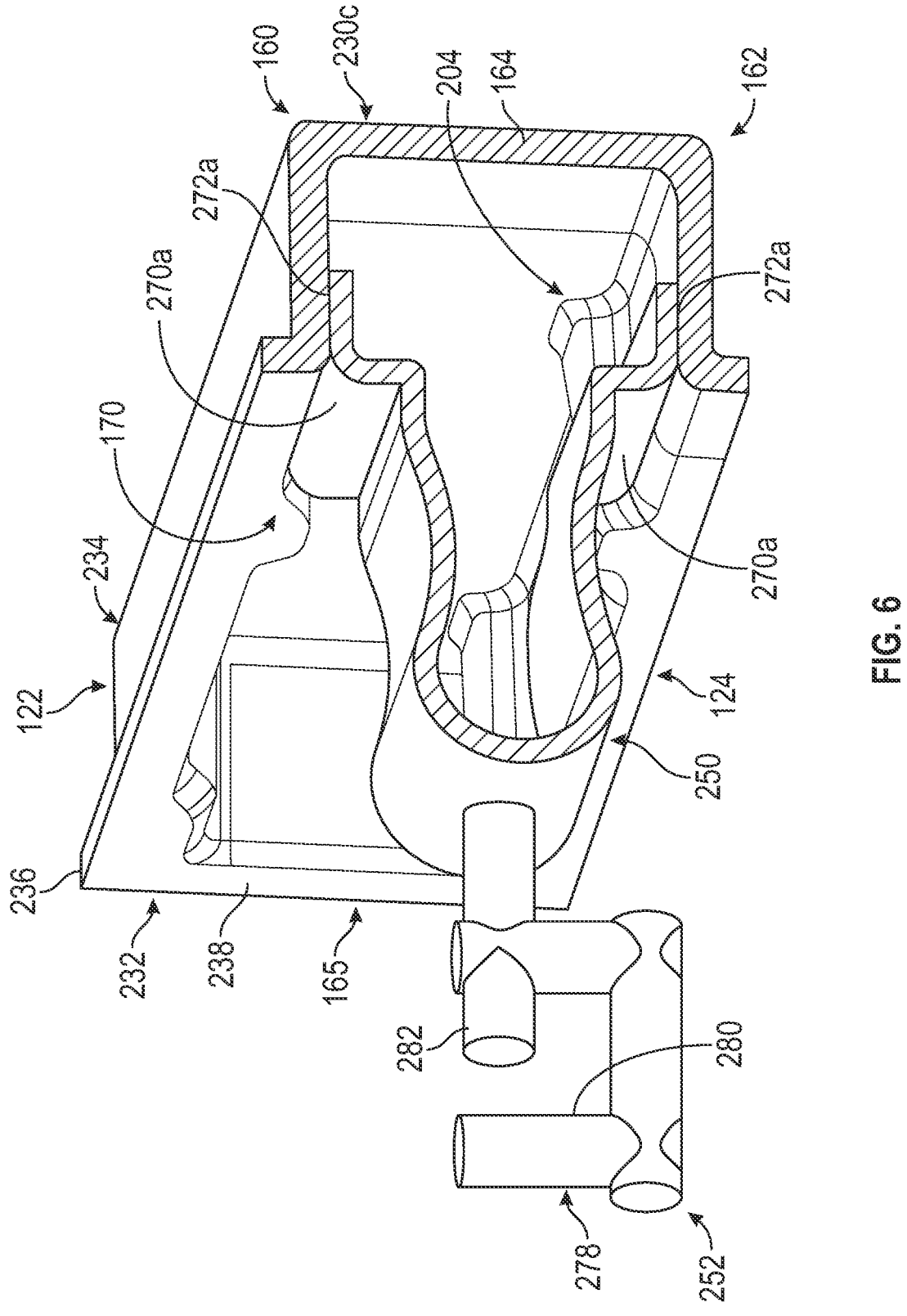
FIG. 6 is a perspective cross-sectional view of the trim storage system, in which a cover associated with the trim storage system has been removed for clarity.

The base 164 is coupled to and interconnects the sidewalls 165, 166, the first flange 160 and the second flange 162. With additional reference to FIG. 4, the base 164 is substantially planar or flat, and is smooth to facilitate the movement of the fastener 124. With additional reference to FIG. 6, each of the sidewalls 165, 166 include a first sidewall end 232 and an opposite second sidewall end 234. Opposed sides 165a, 165b, 166a, 166b of the sidewalls 165, 166 are coupled to or integrally formed with the respective one of the first flange 160 and the second flange 162. The first sidewall end 232 includes a third lip 236 that cooperates to define a third contact surface 238. The third contact surface 238 is coupled to the second cover surface 132 of the cover 120. The second sidewall end 234 is coupled to the base 164. The first contact surface 174, the second contact surface 208 and the third contact surfaces 238 cooperate to surround an opening 240 that is defined by the guide 122, and the cover 120 is coupled to the first contact surface 174, the second contact surface 208 and the third contact surfaces 238 to at least partially enclose the opening 240. In this example, partial ribs 242a, 242b are defined proximate the sidewall 165. The partial ribs 242a, 242b extend inward from the respective interior surface 160a, 162a of the respective one of the first flange 160 and the second flange 162. The partial ribs 242a, 242b act as a stop for the further movement of the fastener 124, while assisting in retaining the fastener 124 within the pocket 230d. It should be noted that in other embodiments, a wall may be defined to extend along the sidewall 165 from the first flange 160 to the second flange 162.

Figure 7:
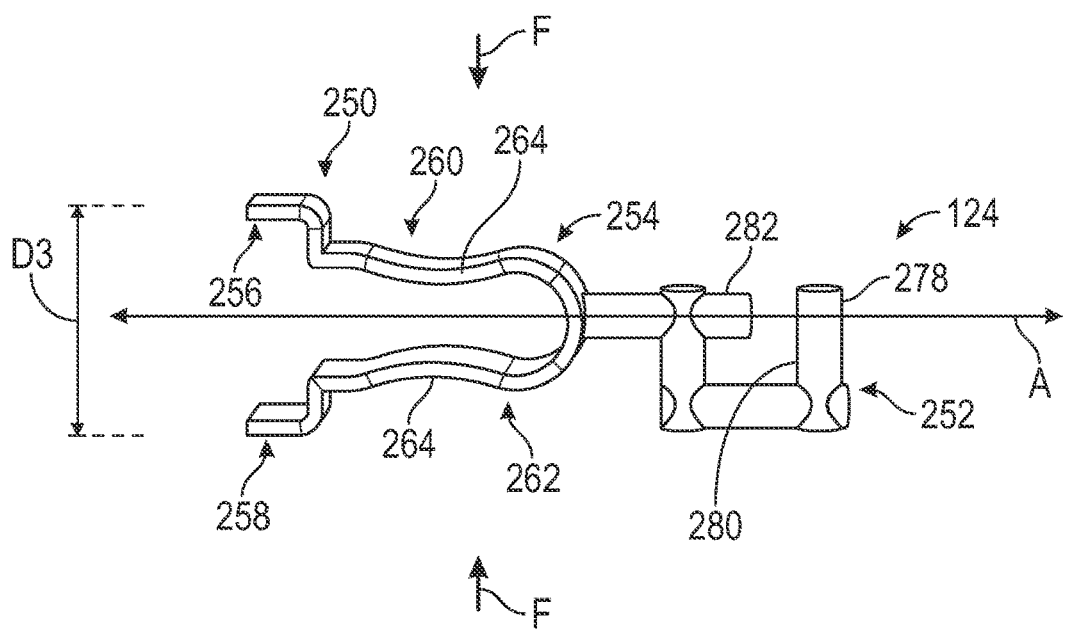
FIG. 7 is a side view of an exemplary fastener associated with the trim storage system.

With reference to FIG. 7, the fastener 124 is shown in greater detail. The fastener 124 is composed of a metal, metal alloy, polymer-based material, and may be molded, cast, additively manufactured, etc. In this example, the fastener 124 includes a coupling portion 250 and an attachment portion 252. The coupling portion 250 removably couples the fastener 124 to the guide 122. In one example, the coupling portion 250 includes a body 254, a first coupling tab 256 and a second coupling tab 258. The coupling portion 250 is substantially symmetric about the axis A. The body 254 is substantially C-shaped, and forms a biasing member or spring. In one example, the body 254 includes a first arm 260 and an opposite second arm 262. The first arm 260 and the second arm 262 are interconnected at one end, and opposed ends of the first arm 260 and the second arm 262 are coupled to the respective one of the first coupling tab 256 and the second coupling tab 258. Each of the first arm 260 and the second arm 262 include a concave exterior depression 264, which provides a visual indicator as to a location on the body 254 for a user to squeeze to compress or elastically deform the body 254. Generally, the user squeezes the body 254, by applying a pinching force F to the concave exterior depressions 264, the body 254 elastically deforms, which enables the coupling tabs 256, 258 to pass through the slots 228a-228d (FIG. 5).

Figure 8:
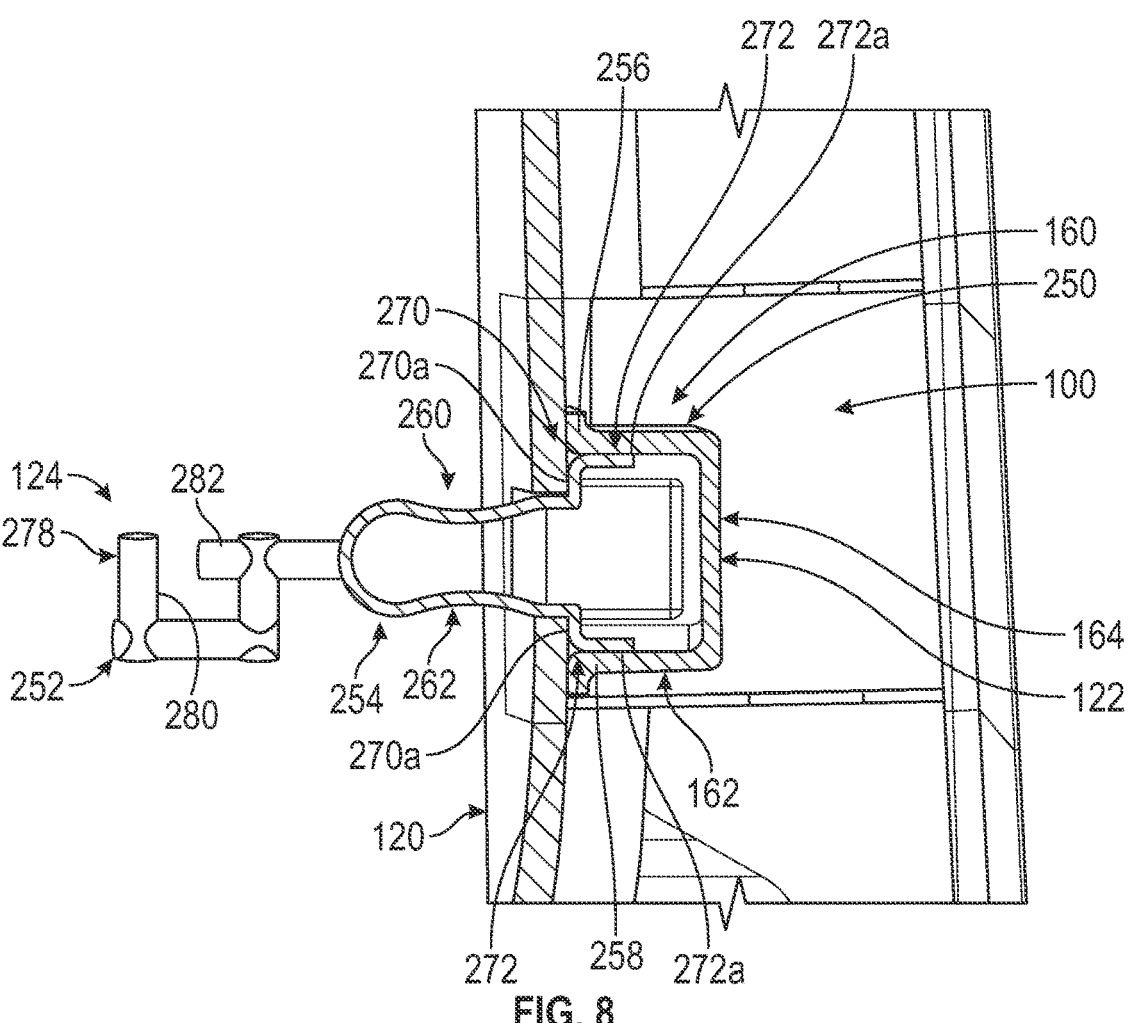
FIG. 8 is a cross-sectional view of the trim storage system, taken along line 8-8 of FIG. 2.

The coupling tabs 256, 258 are substantially L-shaped and are spaced apart by a distance D3. The distance D3 is different, and greater than, the distance D2 and the distance D1. The distance D3 is also different and smaller than the height H1, and different and greater than the second height H2 associated with the cover 120 to ensure that the fastener 124 is retained within the cover 120. The height H1 and width W1 of the keyed section 150 are also different and greater than the distance D3 to ensure that the fastener 124 is easily received within the cover guide slot 138. By providing the coupling tabs 256, 258 of the coupling portion 250 spaced apart by the distance D3, the coupling tabs 256, 258 apply a reaction force to the first interior surface 160a and the second interior surface 162a, respectively, which assists in retaining the fastener 124 within the respective pocket 230a-230d. Each of the coupling tabs 256, 258 include a first coupling section 270 and a second coupling section 272. The first coupling section 270 extends substantially perpendicular to the respective one of the arms 260, 262. With additional reference to FIG. 8, a first surface 270a of the first coupling section 270 contacts the second cover surface 132 when the fastener 124 is received in the respective pocket 230a-230d, and is defined along an axis substantially perpendicular to the longitudinal axis L. The second coupling section 272 extends substantially parallel to the respective one of the arms 260, 262. A second surface 272a of the second coupling section 272 contacts the interior surface 160a, 162a of the respective one of the first flange 160 and the second flange 162 when the fastener 124 is received in the respective pocket 230a-230d. The second surface 272a is defined along an axis substantially parallel to the longitudinal axis L. The contact between the first surface 270a and the second cover surface 132 along with the contact between the second surface 272a of the second coupling section 272 and the respective interior surface 160a, 162a ensures that the fastener 124 remains coupled to the guide 122 upon the application of force to the attachment portion 252 and during movement of the vehicle 10. Generally, the contact between the first surface 270a and the second cover surface 132 resists gravity or forces pulling on the attachment portion 252. The contact between the second surface 272a of the second coupling section 272 applies the reaction force to retain the fastener 124 within the respective pocket 230a-230d.

In this example, the attachment portion 252 is a hook 278, but the attachment portion 252 may comprise any suitable attachment for use within the vehicle 10, including, but not limited to a clip, hook and loop fastener, post, etc. In this example, the attachment portion 252 is cantilevered outward from the coupling portion 250. The hook 278 defines an attachment opening 280 and a retaining tab 282, which extends axially into the attachment opening 280. The attachment opening 280 defined by a body of the hook 278 is substantially C-shaped, and the retaining tab 282 extends into the attachment opening 280 to assist in retaining an object, such as a bag, loop attached to a bottle, a net or the like to the hook 278. Thus, generally, the attachment portion 252 of the fastener 124 is configured to or is capable of retaining an item or storing an item within the vehicle 10.

Figure 9:
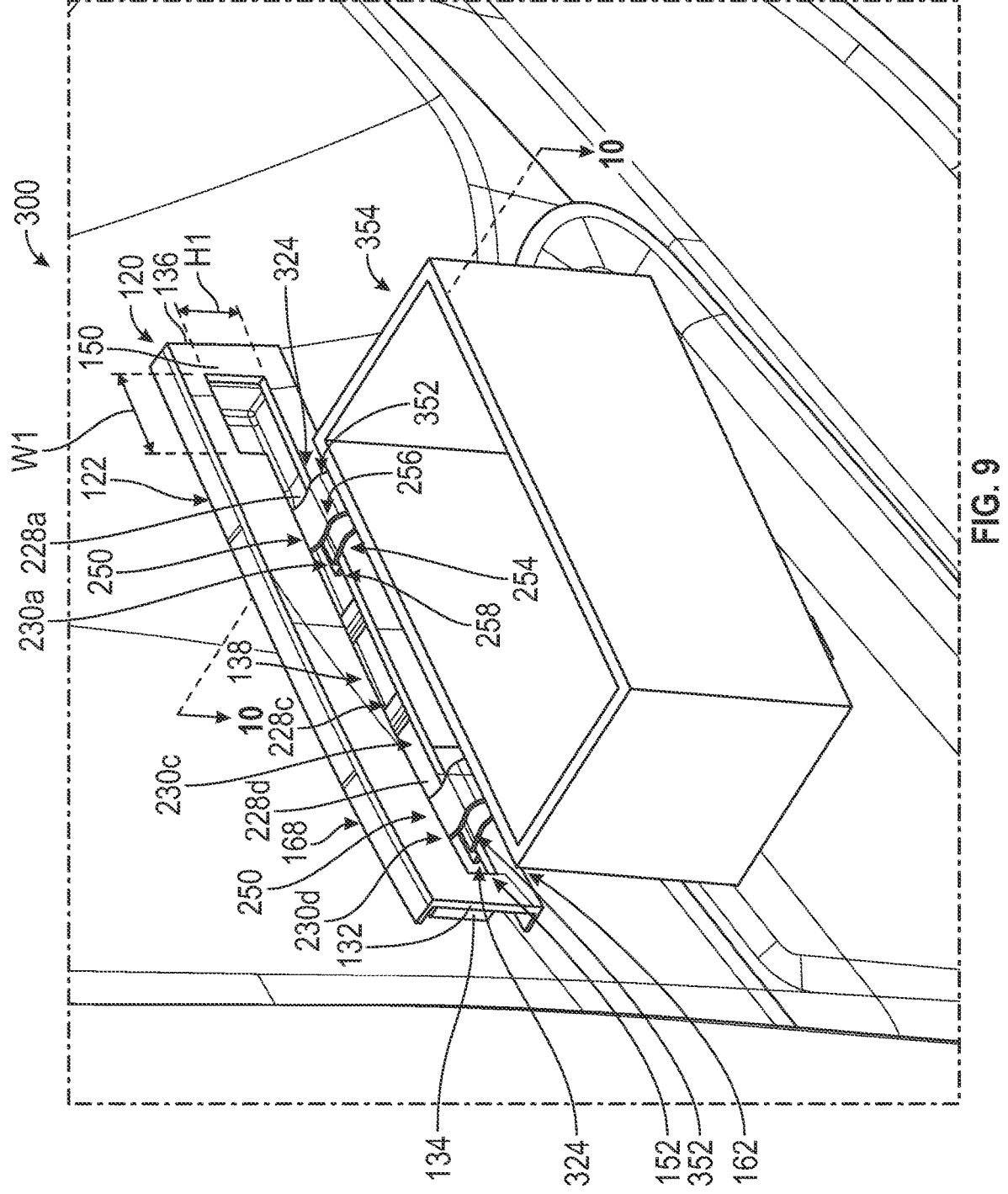
FIG. 9 is a schematic perspective illustration of another exemplary trim storage system for a trim panel associated with one of the doors of the vehicle of FIG. 1, in accordance with various embodiments.

It should be noted that while the attachment portion 252 is described herein as comprising the hook 278 to enable the storage of objects within the vehicle 10, the attachment portion 252 may be configured differently. In one example, with reference to FIG. 9, the trim storage system 300 is shown, which may be coupled to one or more of the doors 22 of the vehicle 10. As the trim storage system 300 includes components that are the same or similar to components of the trim storage system 100 discussed with regard to FIGS. 1-8, the same reference numerals will be used to denote the same or similar components. In one example, the trim storage system 300 includes the cover 120, the guide 122 and at least one fastener 324. In this example, the trim storage system 300 is coupled to the door 22 so as to be received within the recess 126 defined in the trim panel 106 of the door 22 (FIG. 2). For example, the trim storage system 300 may be coupled to the recess 126 via a press-fit, snap-fit, adhesives, mechanical fasteners, etc. The cover 120 includes the first cover surface 130 opposite the second cover surface 132, the first cover side 134 opposite the second cover side 136, and the cover guide slot 138. The cover guide slot 138 includes the keyed section 150 and the guide section 152. The keyed section 150 is shaped to correspond with the fastener 324, and in one example, the keyed section 150 is substantially rectangular. The enlarged height H1 and width W1 of the keyed section 150 enable the insertion and removal of the fastener 324. It should be noted that the shape of the keyed section 150 is merely exemplary, and that the keyed section 150 may have any desired shape that corresponds with a shape of the fastener 324. The guide section 152 receives the fastener 324 from the keyed section 150, and guides the fastener 324 as the fastener 324 moves relative to the guide 122. Generally, the guide section 152 cooperates with a portion of the fastener 324 to assist in retaining the fastener 324 within the guide 122. In this example, the guide section 152 is substantially rectangular, however, in other embodiments, the guide section 152 may have a different shape to comport with the shape of the fastener 324.

The guide 122 is substantially U-shaped, and includes the first flange 160, the second flange 162 opposite the first flange 160 and the base 164. The sidewalls 165, 166 interconnect the first flange 160 and the second flange 162 on opposed sides 122a, 122b of the guide 122 (FIG. 5). The rib surfaces 188, 216 and the lock surfaces 192, 220 cooperate to define respective slots 228a-228d, which are spaced apart along the guide 122 from the first side 122a to the second side 122b. The slots 228a-228d generally require the compression of the fastener 324 to pass through the slot 228a-228d, which inhibits the fastener 324 from moving unintentionally. This ensures that once the fastener 324 is coupled within the guide 122, the fastener 324 remains seated within the guide 122 until removed by the user. As discussed, a continued movement of the fastener 324 through the slot 228a-228d causes the fastener 324 to expand and seat in a respective pocket 230a-230d.

Figure 10:
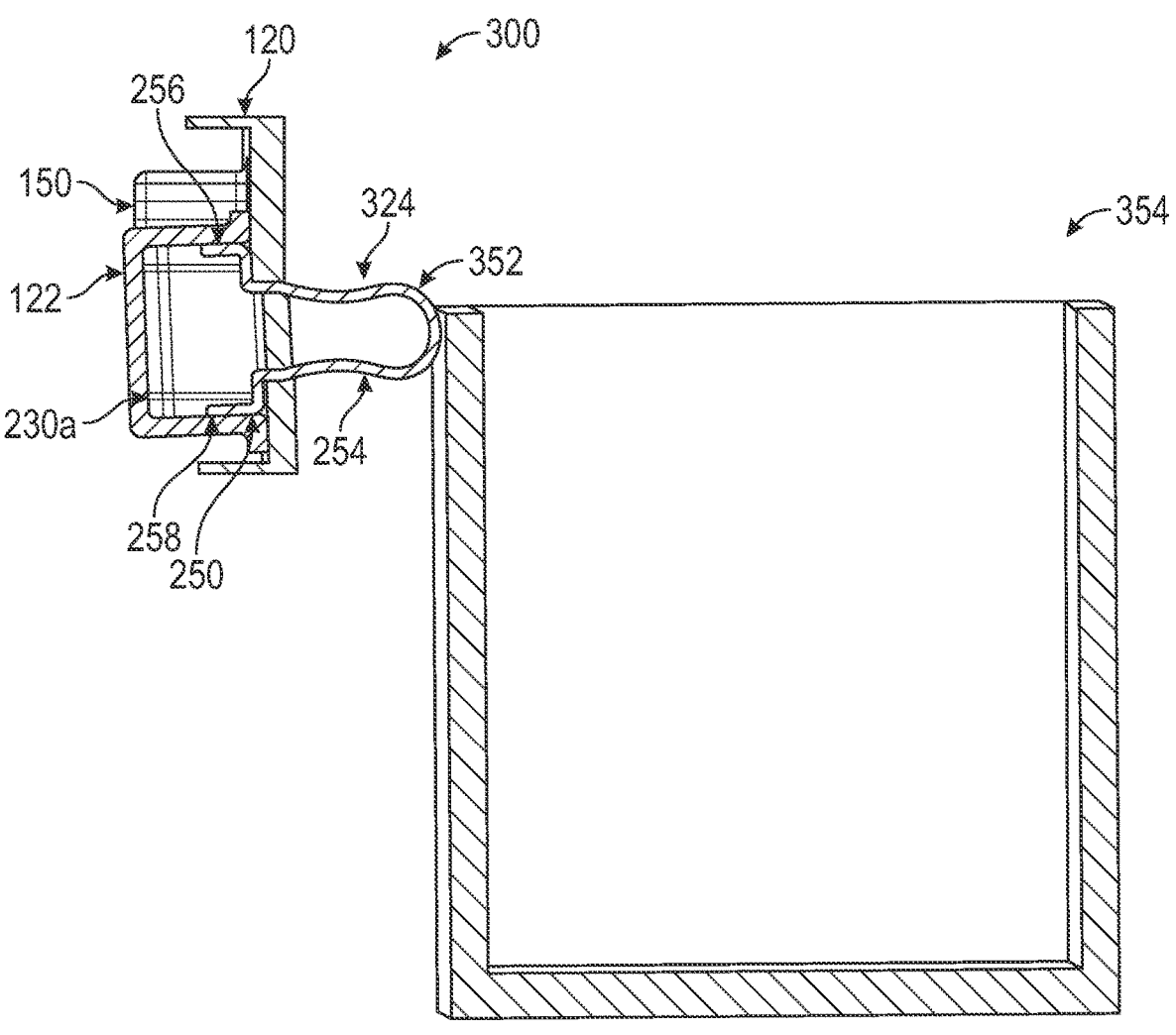
FIG. 10 is a cross-sectional view of the trim storage system of FIG. 9, taken along line 10-10 of FIG. 9.

The fastener 324 is composed of a metal, metal alloy or a polymer-based material, and may be molded, cast, additively manufactured, etc. In this example, the fastener 324 includes the coupling portion 250 and an attachment portion 352. The coupling portion 250 removably couples the fastener 324 to the guide 122. The coupling portion 250 includes the body 254, the first coupling tab 256 and the second coupling tab 258. In this example, with reference to FIG. 10, the attachment portion 352 is a portion of a storage receptacle 354, but it should be noted that the attachment portion 352 may comprise a post or the like that is configured to be coupled to a discrete storage receptacle. In this example, the body 254 of the coupling portion 250 is coupled to or integrally formed with the storage receptacle 354 such that the storage receptacle 354 comprises the attachment portion 352 of the fastener 324. In this example, the trim storage system 300 includes two of the fasteners 324, with the attachment portion 352 of each of the fasteners 324 comprising a portion of the storage receptacle 354. Stated another way, the trim storage system 300 includes the storage receptacle 354, which includes the fasteners 324 having the coupling portion 250, which couple the storage receptacle 354 to the guide 122 and thus, the vehicle 10. In this example, the storage receptacle 354 is a rectangular box, but the storage receptacle 354 may have any desired shape. Further, the storage receptacle 354 may be sized such that a single one of the fasteners 324 is coupled to the storage receptacle 354. Thus, generally, the attachment portion 352 of the fastener 324 is configured to or is capable of retaining an item or storing an item within the vehicle 10.

Figure 11:
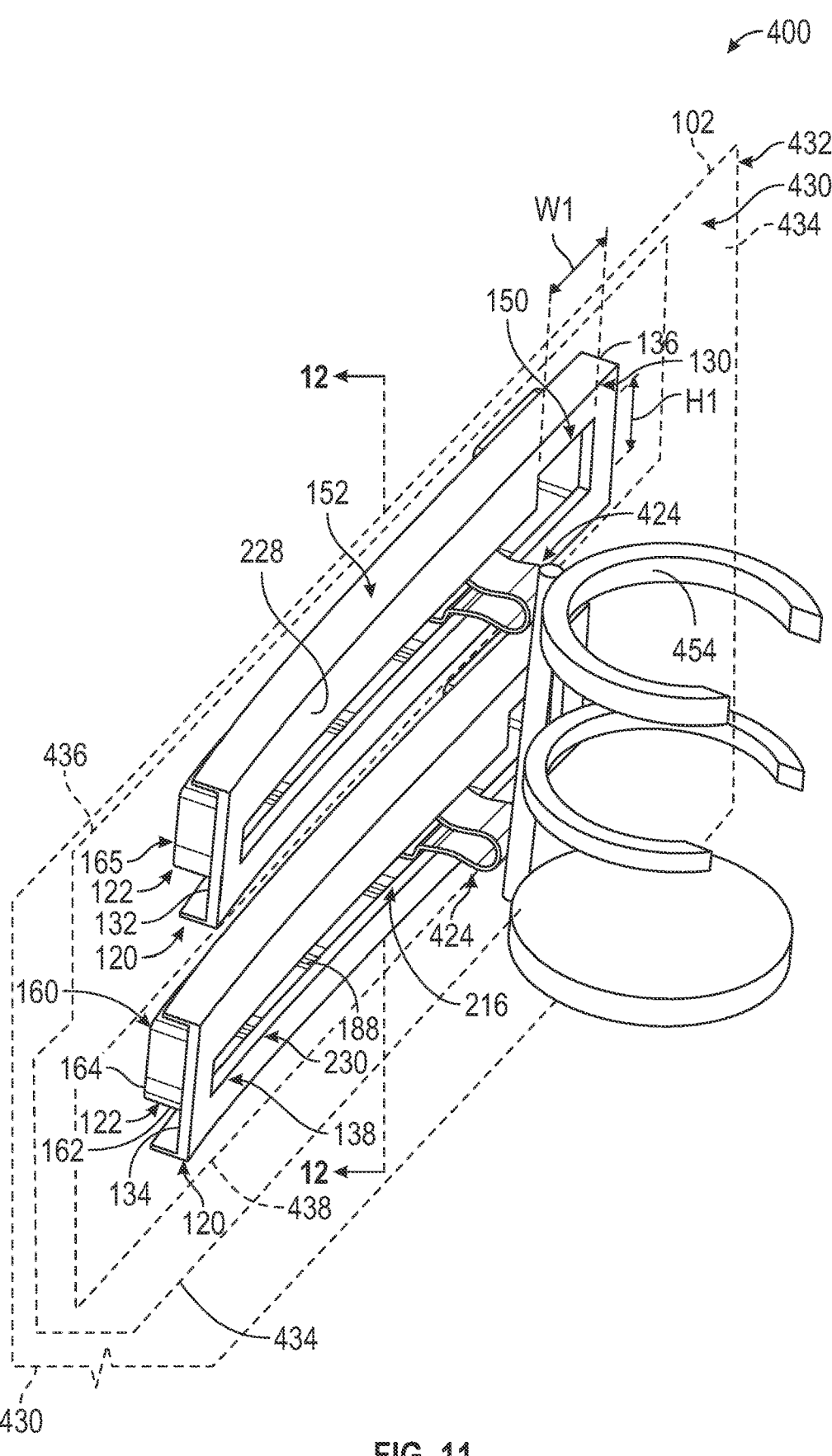
FIG. 11 is a schematic perspective illustration of another exemplary trim storage system for a trim panel associated with one of the doors of the vehicle of FIG. 1, in accordance with various embodiments.
Figure 12:
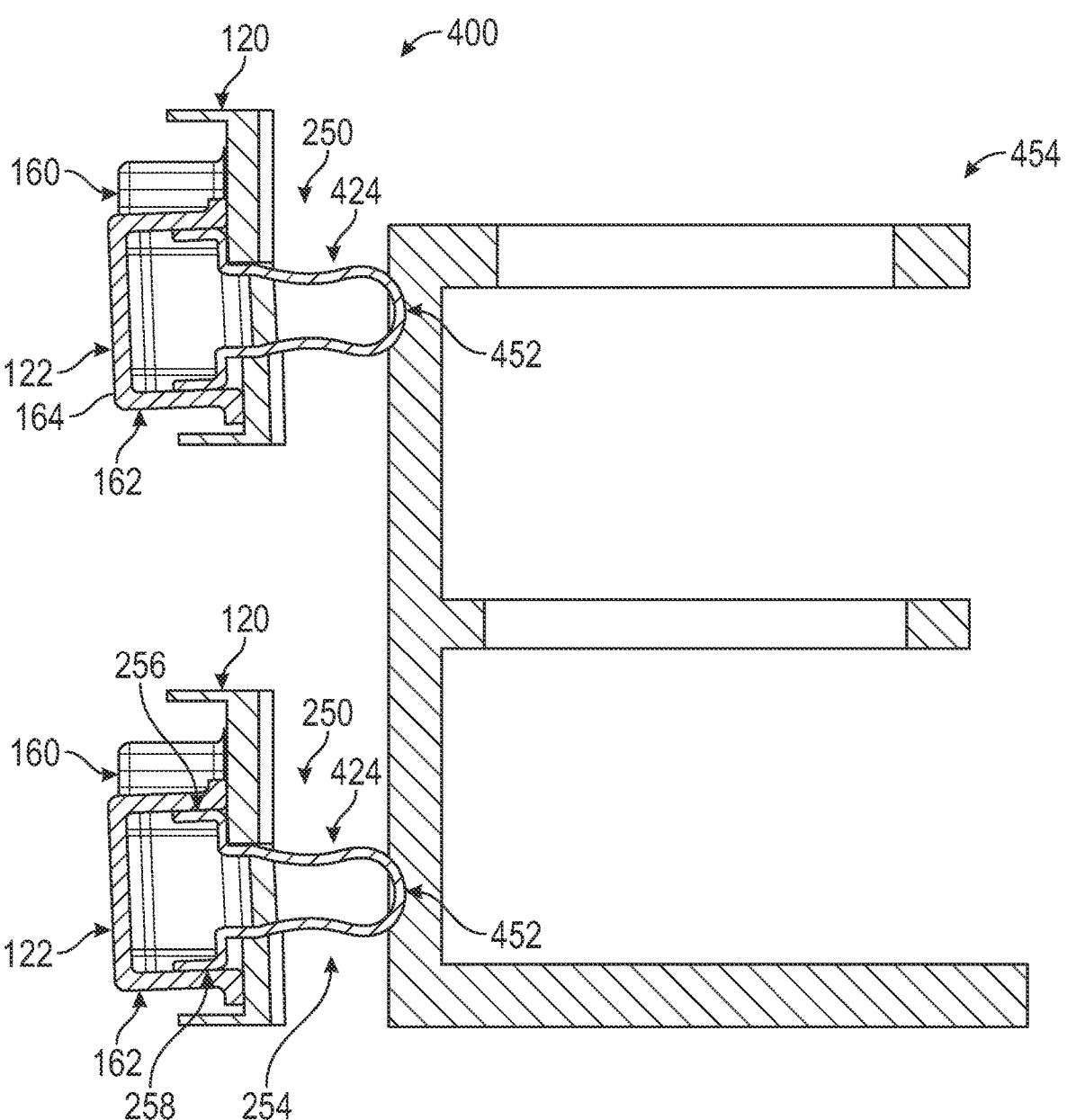
FIG. 12 is a cross-sectional view of the trim storage system of FIG. 11, taken along line 12-12 of FIG. 11.

It should be noted that while the trim storage system 100 is described herein as comprising a single cover 120 and guide 122 for use with one or a plurality of fasteners 124, 324 to enable the storage of objects within the vehicle 10, the trim storage system 100 may be configured differently. In one example, with reference to FIG. 11, a trim storage system 400 is shown, which may be coupled to one or more of the doors 22 of the vehicle 10. As the trim storage system 400 includes components that are the same or similar to components of the trim storage system 100 discussed with regard to FIGS. 1-8, the same reference numerals will be used to denote the same or similar components. In one example, the trim storage system 400 includes a plurality of the covers 120, a plurality of the guides 122 and at least one fastener 424. In this example, the trim storage system 400 includes two of the covers 120 and two of the guides 122 for use with any number of the fasteners 424. In this example, the trim storage system 400 is coupled to a door 430. The covers 120 and the guides 122 are spaced apart from each other on the door 430. The door 430 includes the outer panel 102 and an inner panel 432 opposite the outer panel 102. The inner panel 432 includes a trim panel 434. In one example, the trim panel 434 includes the trim storage system 400. In certain examples, the door 430 may also include the door pull handle receptacle 108, the user interface panel receptacle 110 and the speaker grill 112, as shown in FIG. 2. In this example, the trim panel 434 does not include or is devoid of a cup holder and a map pocket, and the trim storage system 400 provides all of the available storage for the door 430, which is customizable.

The trim storage system 400 is coupled to the door 430 so as to be received within a respective recess 436, 438 defined in the trim panel 434 of the door 430 (FIG. 2). For example, the trim storage system 400 may be coupled to the respective recess 436, 438 via a press-fit, snap-fit, adhesives, mechanical fasteners, etc. Each of the covers 120 includes the first cover surface 130 opposite the second cover surface 132, the first cover side 134 opposite the second cover side 136, and the cover guide slot 138. The cover guide slot 138 includes the keyed section 150 and the guide section 152. The keyed section 150 is shaped to correspond with the fasteners 424, and in one example, the keyed section 150 is substantially rectangular. The enlarged height H1 and width W1 of the keyed section 150 enables the insertion and removal of the fasteners 424. It should be noted that the shape of the keyed section 150 is merely exemplary, and that the keyed section 150 may have any desired shape that corresponds with a shape of the fasteners 424. The guide section 152 receives the fasteners 424 from the keyed section 150, and guides the fasteners 424 as the fasteners 424 move relative to the guide 122. Generally, the guide section 152 cooperates with a portion of the fasteners 424 to assist in retaining the fasteners 424 within the guide 122. In this example, the guide section 152 is substantially rectangular, however, in other embodiments, the guide section 152 may have a different shape to comport with the shape of the fasteners 424.

Each of the guides 122 is substantially U-shaped, and includes the first flange 160, the second flange 162 opposite the first flange 160 and the base 164. The sidewalls 165, 166 interconnect the first flange 160 and the second flange 162 on opposed sides 122a, 122b of the guide 122 (FIG. 5). The rib surfaces 188, 216 and the lock surfaces 192, 220 cooperate to define respective slots 228 (228a-228d), which are spaced apart along the guide 122 from the first side 122a to the second side 122b. The slots 228 generally require the compression of the fasteners 424 to pass through the slot 228, which inhibits the fasteners 424 from moving unintentionally. This ensures that once the fasteners 424 are coupled within the guide 122, the fasteners 424 remain seated within the guide 122 until removed by the user. As discussed, a continued movement of the fastener 424 through the slot 228 causes the fastener 424 to expand and seat in a respective pocket 230 (230a-230d).

The fasteners 424 are each composed of a metal, metal alloy or polymer-based material, and may be molded, cast, additively manufactured, etc. In this example, each of the fasteners 424 includes the coupling portion 250 and an attachment portion 452. The coupling portion 250 removably couples the fasteners 424 to the respective guide 122. The coupling portion 250 includes the body 254, the first coupling tab 256 and the second coupling tab 258. In this example, the attachment portion 452 is a portion of a cupholder 454, but it should be noted that the attachment portion 452 may comprise a post or the like that is configured to be coupled to a discrete cupholder. In this example, the body 254 of the coupling portion 250 is coupled to or integrally formed with the cupholder 454 such that the cupholder 454 comprises the attachment portion 452 of the fastener 424. In this example, the trim storage system 400 includes two of the fasteners 424, with the attachment portion 452 of each of the fasteners 424 comprising a portion of the cupholder 454. Stated another way, the trim storage system 400 includes the cupholder 454, which includes the fasteners 424 having the coupling portion 250, which couple the cupholder 454 to the respective one of the guides 122 and thus, the vehicle 10. In this example, the cupholder 454 includes two C-shaped retaining members and a flat bottom to support the cup, but the cupholder 454 may have any desired shape. Further, the cupholder 454 may be sized such that a single one of the fasteners 424 is coupled to the cupholder 454 and thus, one of the guides 122. Thus, generally, the attachment portion 452 of the fastener 424 is configured to or is capable of retaining an item or storing an item within the vehicle 10.

In one example, in order to assemble the trim storage system 100, 300, 400, with the outer panel 102 coupled to the inner panel 104, the respective trim panel 106, 434 is coupled to the inner panel 104 with the recess 126, 436, 438 defined in the trim panel 106, 434. With the guide 122 and the cover 120 formed, the guide 122 is coupled to the cover 120 such that the first contact surface 174, the second contact surface 208 and the third contact surfaces 238 are coupled to the second cover surface 132 via adhesives, ultrasonic welding, etc. The cover 120, with the guide 122 attached thereto, is inserted into and coupled to the respective recess 126, 436, 438.

With the cover 120 and the guide 122 coupled to the trim panel 106, 434, one or more of the fasteners 124, 324, 424 are inserted into the keyed section 150. A pinching force may be applied to the body 254 of the respective fastener 124, 324, 424 to compress the body 254 and advance the respective fastener 124, 324, 424 up the guide ramp surfaces 186, 214 into the slot 228*a* defined between the rib surfaces 188, 216. The further advancement of the respective fastener 124, 324, 424 causes the respective fastener 124, 324, 424 to exit the slot 228*a* and expand to couple the respective fastener 124, 324, 424 to the pocket 230*a*. In order to move the respective fastener 124, 324, 424 to the adjacent pocket 230*b*, the pinching force may be applied to the body 254 of the respective fastener 124, 324, 424 to compress the body 254 and advance the respective fastener 124, 324, 424 up the lock ramp surfaces 194, 218 and into the slot 228*b* defined between the lock surfaces 192, 220. The further advancement of the respective fastener 124, 324, 424 causes the respective fastener 124, 324, 424 to exit the slot 228*b* and expand to couple the respective fastener 124, 324, 424 to the pocket 230*b*. This process may be repeated to move the respective fastener 124, 324, 424 through the slot 228*c* and into the pocket 230*c*, and through the slot 228*d* and into the pocket 230*d*.

In order to remove the respective fastener 124, 324, 424 from the cover 120 and the guide 122, the pinching force may be applied to the body 254 of the respective fastener 124, 324, 424 to compress the body 254 and move the respective fastener 124, 324, 424 up the lock ramp surfaces 194, 222 into the slot 228*d* defined between the rib surfaces 188, 216. The further advancement of the respective fastener 124, 324, 424 causes the respective fastener 124, 324, 424 to exit the slot 228*d* and expand to couple the respective fastener 124, 324, 424 to the pocket 230*c*. This process can be repeated until the respective fastener 124, 324, 424 exits the slot 228*a*, and is moved down the guide ramp surfaces 186, 214 into the keyed section 150. Once returned to the keyed section 150, the respective fastener 124, 324, 424 may be removed from the guide 122 and the cover 120.

Thus, the trim storage system 100, 300, 400 enables the use of multiple fasteners 124, 324, 424 to couple various items to the trim panel 106, 434 for storage. Generally, a respective one of the fasteners 124, 424 may be coupled to a respective one of the pockets 230*a*-230*d*, which enables multiple customizable storage options for the user of the vehicle 10. In addition, by providing the attachment portion 352 of the fasteners 324 integrally formed with the storage receptacle 354, the storage receptacle 354 is easily removed, if desired, and may accompany the user upon exiting the vehicle 10. Further, by providing the attachment portion 452 of the fasteners 424 integrally formed with the cupholder 454, the cupholder 454 is easily removed, if desired, and may accompany the user upon exiting the vehicle 10 for use in another vehicle 10, for example. In addition, the trim storage system 400 enables the use of the fastener 424, along with the fasteners 124, 324 to provide customizable storage to meet the needs of the user of the vehicle 10. The trim storage system 100, 300, 400 also provides an aesthetically appealing appearance, while providing customizable storage for the user of the vehicle 10. The use of the fasteners 124, 324, 424 enables the user to customize the storage in the vehicle 10 easily and quickly, which increases user satisfaction. In addition, the use of the fasteners 124, 324, 424 does not require additional or special tools to couple the fasteners 124, 324, 424 to the vehicle 10.

It should be noted that while not illustrated herein, the fasteners 124, 324, 424 may be used with any of the trim storage systems 100, 300, 400. Moreover, it should be understood that any number of the fasteners 124, 324, 424 may be employed with any one of the trim storage systems 100, 300, 400. It should be understood that generally, the fastener 124, 324, 424 comprises an accessory for use with or for the vehicle 10. Further, it should be noted that any suitable item may be coupled to the guide 122 for storage within the vehicle 10 so long as the fastener 124, 324, 424 is coupled to or integrally formed with the item. For example, a platform, stand or support structure may include one or more of the fasteners 124, 324, 424, and the platform, stand or support structure may support or receive a personal electronic device, including, but not limited to a tablet, laptop, phone, portable entertainment device, etc. In certain instances, the item coupled to the trim storage system 100, 300, 400, such as the platform, stand or support structure may also include a charging device such that the user may also charge their personal electronic device as it is supported or retained by the trim storage system 100, 300, 400.

Further, it should be noted that while the trim storage system 100, 300, 400 is described and illustrated herein as including the cover 120, which is separate from the door 22, in other embodiments, the trim storage system 100, 300, 400 may be integrally formed with the door 22. In these examples, the trim panel 106 comprises the cover 120 such that the cover guide slot 138 is defined through the trim panel 106. Stated another way, in certain embodiments, the trim panel 106 includes the cover guide slot 138. The guide 122 is coupled to a back side of the trim panel 106 so as to be disposed between the trim panel 106 and the outer panel 102. The back side of the trim panel 106 is opposite a front side that faces into the passenger cabin 20. Thus, it should be understood that in certain embodiments, the cover 120 may not be necessary and the cover guide slot 138 may be defined within the trim panel 106 such that the trim storage system 100, 300, 400 is integrally formed with the trim panel 106.

Figure 13:
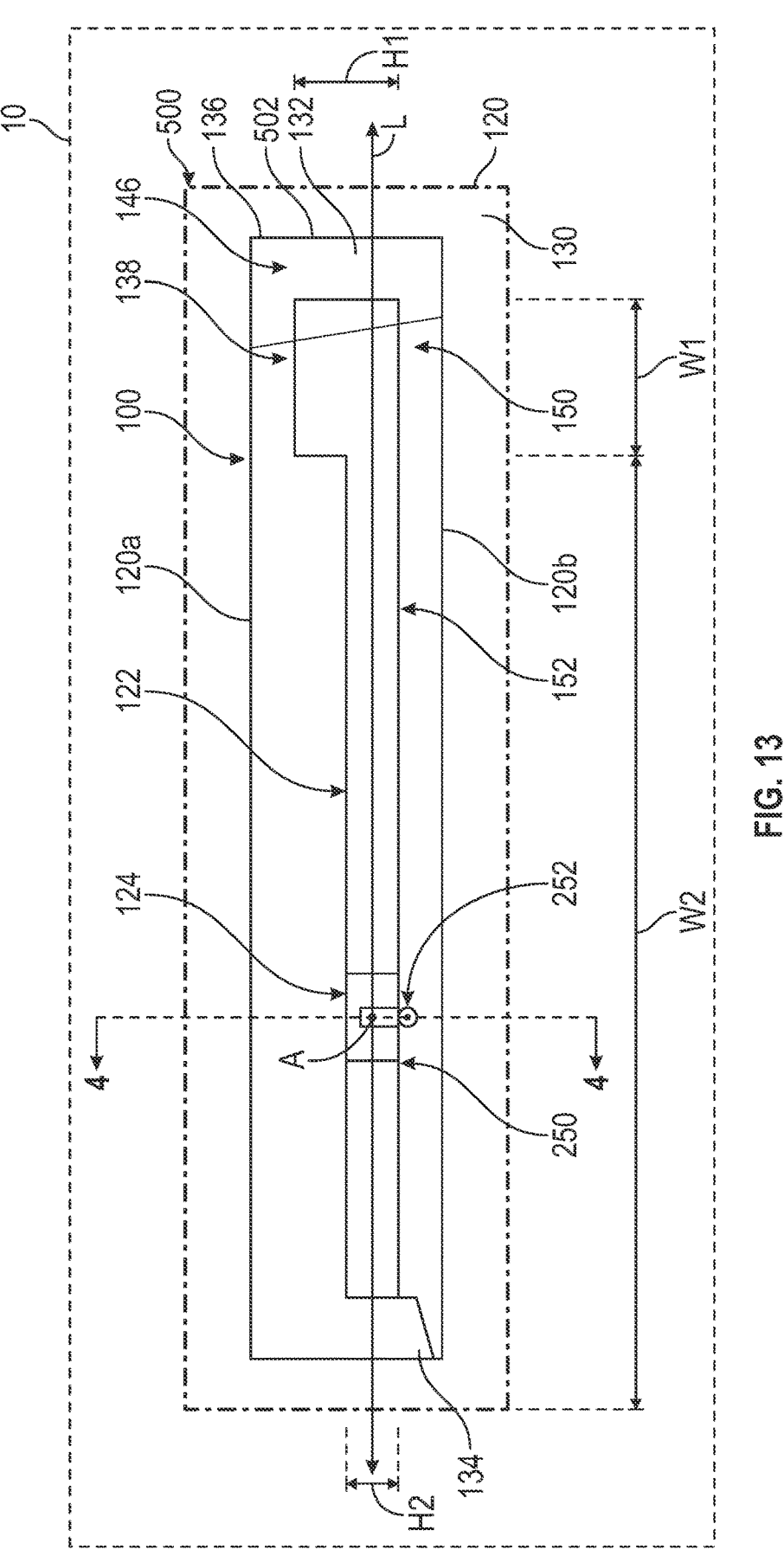
FIG. 13 is a schematic perspective illustration of the exemplary trim storage system associated with another trim panel of the vehicle of FIG. 1, in accordance with various embodiments.

In addition, it should be noted that while the trim storage system 100, 300, 400 is described herein as being coupled to one or more of the doors 22, the trim storage system 100, 300, 400 may be coupled to a trim panel 500, as shown in FIG. 13. The trim panel 500 may comprise any suitable trim panel 500 within the vehicle 10, which is capable of supporting the trim storage system 100, 300, 400 and the associated item. For example, the trim panel 500 includes, but is not limited to, a cargo area associated with the vehicle 10, a surface of a C or D pillar associated with the vehicle 10, a back of a passenger seat associated with the vehicle 10, a console associated with the vehicle 10, etc. In the example of FIG. 13, the trim storage system 100 is shown coupled to the trim panel 500, but it should be understood that the trim storage system 300 or the trim storage system 400 may also be employed with the trim panel 500. As discussed with reference to FIGS. 1-8, the trim storage system 100 includes the cover 120, the guide 122 and the at least one fastener 124. In this example, the trim panel 500 includes a recess 522, which receives the trim storage system 100. It should be noted that in other examples, the trim storage system 100 may be integrally formed with the trim panel 500 such that the trim panel 500 comprises the cover 120 and the cover guide slot 138 is defined directly in the trim panel 500. Thus, it should be understood that that trim storage system 100, 300, 400 may be used in conjunction with other areas of the vehicle 10 and is not limited to the trim panel 106 associated with the one or more doors 22.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A trim storage system for a vehicle, comprising:

a cover coupled to the vehicle and defining a guide slot that extends along a longitudinal axis;

a guide disposed on a first side of the cover, the guide being U-shaped and including a first flange opposite a second flange, the first flange defining one or more first ribs that extend from the first flange, the second flange defining one or more second ribs that extend toward a respective first rib of the first ribs to define one or more slots spaced apart along the longitudinal axis, and a pocket is defined between adjacent slots of the slots; and a fastener removably coupled to the pocket of the guide having an attachment portion configured to retain an item and disposed on a second side of the cover, the fastener having a coupling portion extending through the guide slot of the cover, wherein the coupling portion includes a first coupling tab and a second coupling tab, that are at least partially received within the pocket to removably couple the fastener to the pocket, wherein the coupling portion includes a first arm spaced from a second arm, wherein the first arm includes a first end and a second end and the second arm includes a third end and a fourth end, wherein the second end of the first arm is coupled to the first coupling tab and the fourth end of the second arm is coupled to the second coupling tab, wherein the first end of the first arm and the third end of the second arm are interconnected by a C-shaped spring part so that the first arm and the second arm are elastically deformable to removably couple the fastener to the pocket, wherein, when the fastener is coupled to the pocket, the first arm presents, on the second side of the cover and opposite from the guide, a first concave depression, and the second arm presents, on the second side of the cover and opposite from the guide, a second concave depression by which the removable coupling of the fastener to the pocket is operable.

2. The trim storage system of claim 1, wherein the fastener extends from the C-shaped spring part.

3. The trim storage system of claim 1, wherein one first rib of the first ribs comprises a first guide rib that includes a first guide ramp, one second rib of the second ribs comprises a second guide rib that includes a second guide ramp, and the first guide ramp and the second guide ramp are defined proximate a keyed section of the guide slot, wherein the first guide ramp includes a first guide ramp surface, wherein a second guide ramp surface cooperates with the first guide ramp surface to define a compressing slope to compress the coupling portion as the fastener is moved into the guide from the keyed section of the guide slot.

4. The trim storage system of claim 1, wherein the first coupling tab includes a first contact surface that extends along a first axis that is substantially perpendicular to the longitudinal axis, wherein the second coupling tab includes a second contact surface that extends along a second axis that is substantially parallel to the longitudinal axis, wherein the first contact surface and the second contact surface are removably coupled to the pocket.

5. The trim storage system of claim 1, wherein each of the first coupling tab and the second coupling tab includes a first surface that contacts the cover and a second surface that contacts the guide.

6. The trim storage system of claim 1, wherein the attachment portion is a hook.

7. The trim storage system of claim 1, wherein the attachment portion is coupled to a cupholder.

8. The trim storage system of claim 7, wherein the C-shaped spring part is coupled to the cupholder.

9. The trim storage system of claim 1, wherein the attachment portion is coupled to a storage receptacle.

10. The trim storage system of claim 9, further comprising a second fastener having a second coupling portion and a second attachment portion, and the attachment portion and the second attachment portion are each coupled to the storage receptacle.

11. The trim storage system of claim 1, wherein one first rib of the first ribs comprises a first guide rib that includes a first guide ramp, one second rib of the second ribs comprises a second guide rib that includes a second guide ramp, and the first guide ramp and the second guide ramp are defined proximate a keyed section of the guide slot.

12. A vehicle, comprising:

a trim panel; and a trim storage system coupled to the trim panel, and the trim storage system comprises:

a cover coupled to the vehicle and defining a guide slot that extends along a longitudinal axis;

a guide disposed on a first side of the cover, the guide being U-shaped and including a first flange opposite a second flange, the first flange and the second flange coupled to the trim panel, the first flange defining a plurality of first ribs, each first rib of the plurality of first ribs extends from a first surface of the first flange toward the second flange, the second flange defining a plurality of second ribs, each second rib of the plurality of second ribs extends from a second surface of the second flange toward a respective first rib of the plurality of first ribs to define a plurality of slots spaced apart along the longitudinal axis, and a respective pocket of a plurality of pockets is defined by the first surface and the second surface between adjacent slots of the plurality of slots; and a fastener including a coupling portion and an attachment portion, the coupling portion removably coupled to the pocket of the guide and the attachment portion configured to retain an item and disposed on a second side of the cover, wherein the coupling portion extends through the guide slot of the cover, wherein the coupling portion includes a first coupling tab and a second coupling tab, that are at least partially received within the pocket to removably couple the fastener to the pocket, wherein the coupling portion includes a first arm spaced from a second arm, wherein the first arm includes a first end and a second end and the second arm includes a third end and a fourth end, wherein the second end of the first arm is coupled to the first coupling tab and the fourth end of the second arm is coupled to the second coupling tab, wherein the first end of the first arm and the third end of the second arm are interconnected by a C-shaped spring part so that the first arm and the second arm are elastically deformable to removably couple the fastener to the pocket, wherein, when the fastener is coupled to the pocket, the first arm presents, on the second side of the cover and opposite from the guide, a first concave depression, and the second arm presents, on the second side of the cover and opposite from the guide, a second concave depression by which the removable coupling of the fastener to the pocket is operable.

13. The vehicle of claim 12, wherein the fastener extends from the C-shaped spring part.

14. The vehicle of claim 12, wherein one first rib of the first ribs comprises a first guide rib that includes a first guide ramp, one second rib of the second ribs comprises a second guide rib that includes a second guide ramp, and the first guide ramp and the second guide ramp are defined proximate a keyed section of the guide slot, wherein the first guide ramp includes a first guide ramp surface, wherein a second guide ramp surface cooperates with the first guide ramp surface to define a compressing slope to compress the coupling portion as the fastener is moved into the guide from the keyed section of the guide slot.

15. The vehicle of claim 13, wherein the first coupling tab includes a first contact surface that extends along a first axis that is substantially perpendicular to the longitudinal axis, wherein the second coupling tab includes a second contact surface that extends along a second axis that is substantially parallel to the longitudinal axis, and wherein the first contact surface and the second contact surface are removably coupled to the pocket.

16. The vehicle of claim 12, wherein each of the first coupling tab and the second coupling tab includes a contact surface that contacts the cover and a second surface that contacts the guide.

17. The vehicle of claim 12, wherein the attachment portion is a hook.

18. The vehicle of claim 12, wherein the attachment portion is coupled to a cupholder or is coupled to a storage receptacle.

19. An accessory for a vehicle, comprising:

a cover coupled to the vehicle and defining a guide slot that extends along a longitudinal axis;

a guide disposed on a first side of the cover, the guide being U-shaped and including a first flange opposite a second flange, the first flange defining one or more first ribs that extend from the first flange, the second flange defining one or more second ribs that extend toward a respective first rib of the first ribs to define one or more slots spaced apart along the longitudinal axis, and a pocket is defined between adjacent slots of the slots; and a fastener having an attachment portion configured to be coupled to an item, the attachment portion disposed on a second side of the cover, the fastener having a coupling portion extending through the guide slot of the cover, wherein the coupling portion is coupled to the attachment portion, the coupling portion including a body having a first coupling tab and a second coupling tab, the first coupling tab spaced apart from the second coupling tab by a distance, and the body is compressible to move the first coupling tab and the second coupling tab to removably couple the accessory to the vehicle, wherein the first coupling tab and the second coupling tab are at least partially received within the pocket to removably couple the fastener to the pocket, wherein the coupling portion includes a first arm spaced from a second arm, wherein the first arm includes a first end and a second end and the second arm includes a third end and a fourth end, wherein the second end of the first arm is coupled to the first coupling tab and the fourth end of the second arm is coupled to the second coupling tab, wherein the first end of the first arm and the third end of the second arm are interconnected by a C-shaped spring part so that the first arm and the second arm are elastically deformable to removably couple the fastener to the pocket, wherein, when the fastener is coupled to the pocket, the first arm presents, on the second side of the cover and opposite from the guide, a first concave depression, and the second arm presents, on the second side of the cover and opposite from the guide, a second concave depression by which the removable coupling of the fastener to the pocket is operable.

20. The accessory of claim 19, wherein one first rib of the first ribs comprises a first guide rib that includes a first guide ramp, one second rib of the second ribs comprises a second guide rib that includes a second guide ramp, and the first guide ramp and the second guide ramp are defined proximate a keyed section of the guide slot, wherein the first guide ramp includes a first guide ramp surface, wherein a second guide ramp surface cooperates with the first guide ramp surface to define a compressing slope to compress the coupling portion as the fastener is moved into the guide from the keyed section of the guide slot.

* * * * *